NATHANIEL DU BOIS WHITNEY.
VALVE FOR OIL SYSTEMS.
APPLICATION FILED APR. 15, 1922.
1,425,429.
Patented Aug. 8, 1922.
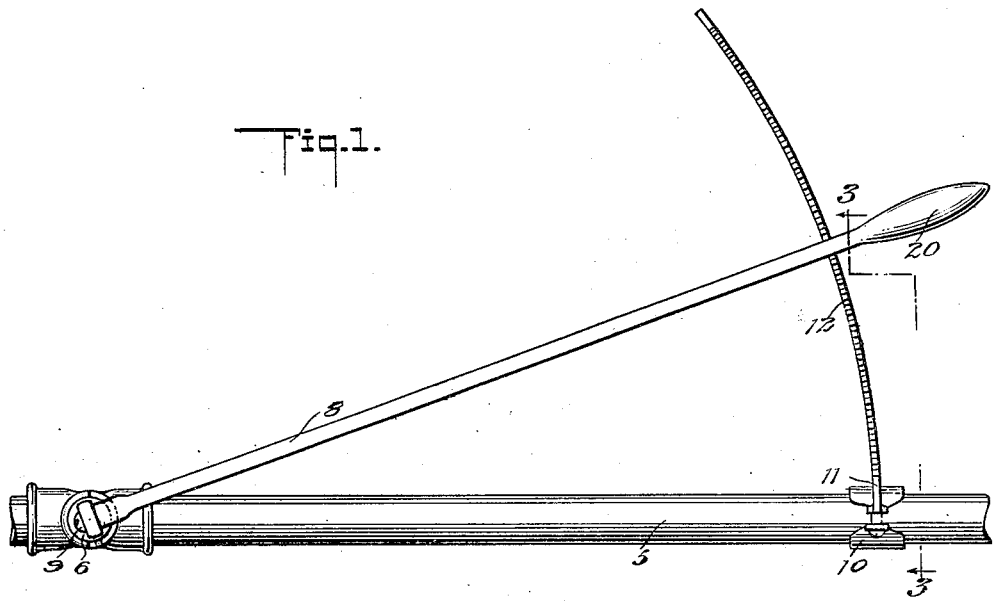
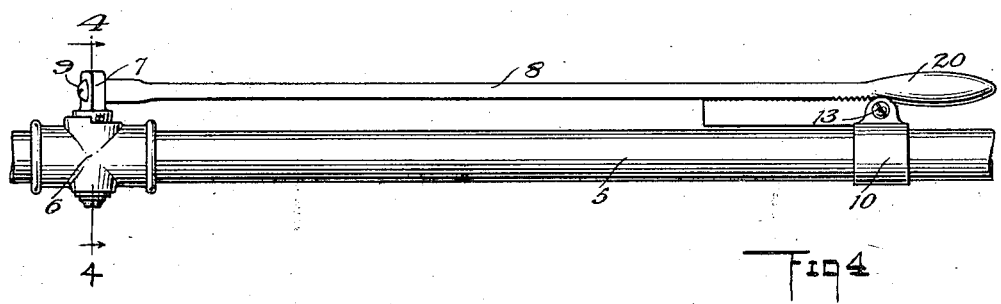
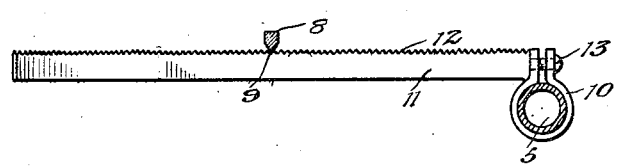
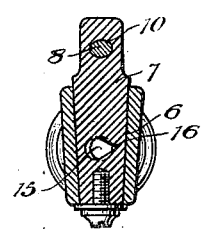
WITNESSES
Frederick Diehl
P. H. Pattison
INVENTOR
N. D. Whitney
BY
ATTORNEYS

UNITED STATES PATENT OFFICE.

NATHANIEL DU BOIS WHITNEY, OF MILFORD, CONNECTICUT.

VALVE FOR OIL SYSTEMS.

1,425,429.  Specification of Letters Patent.  Patented Aug. 8, 1922.

Application filed April 15, 1922. Serial No. 553,122.

*To all whom it may concern:*

Be it known that I, NATHANIEL D. WHITNEY, a citizen of the United States, and a resident of Milford, Walnut Beach, in the county of New Haven and State of Connecticut, have invented a new and Improved Valve for Oil Systems, of which the following is a full, clear, and exact description.

The present invention relates to new and useful improvements in valves and it pertains more particularly to valves especially adapted for use in the fuel lines of oil burners.

It is the primary object of the present invention to provide a new and improved form of valve in which fine adjustments of the valve may be had.

It is a further object of the invention to provide a new and improved form of valve operating mechanism which may be retained in its adjusted position against accidental displacement.

It is a still further object of the invention to provide a new and improved form of valve member adapted to be used in connection with valves of this character.

With the above and other objects in view, reference is had to the accompanying drawings, in which—

Figure 1 is a view in elevation of a device constructed in accordance with the present invention;

Fig. 2 is a similar view taken in a plane at right angles to Fig. 1;

Fig. 3 is a detail sectional view taken on the line 3—3 of Fig. 1;

Fig. 4 is a detail sectional view taken on the line 4—4 of Fig. 2.

Referring more particularly to the drawings, the reference character 5 designates a fuel line, and suitably positioned within said fuel line is a controlling valve 6, which although it is shown as a valve of the turning plug type, may be any type of valve desired.

Secured to the valve stem 7 is an operating member 8, and said operating member 8 is preferably secured in position by means of a screw 9 or the like passing through an opening 10 in the valve stem. As more clearly shown in Fig. 3 this operating member 8 is provided on one of its sides with a knife edge 9, the purpose of which will be hereinafter more clearly set forth.

Secured to the fuel line 5 by means of a circular clamp 10, is a curved bar 11, and said curved bar 11 has one of its edges serrated as indicated by the reference character 12. This circular clamp 10 is caused to grip the fuel line 5 by means of a bolt or screw 13 in order that the same may be properly positioned thereon.

As more clearly shown in Fig. 4, the valve member is provided with an opening 15, and said opening has one of its ends substantially V-shaped as indicated by the reference character 16 in order that a finer adjustment may be had.

The device operates in the following manner;

When it is desired to open the valve the handle 20 of the operating rod 8 is grasped and the knife edge thereof is moved into engagement with any one of the several serrations in the edge of the curved bar 11. By means of the length of the operating member and the large arc on which the bar 11 is curved, it is apparent that a very fine adjustment of the valve may be had since the movement of the operating rod 8 relative to the curved bar 11 is very slight when moved but a notch at a time.

From the foregoing it is apparent that the present invention provides a new and improved valve for fuel lines, and the invention further provides means by which a very fine adjustment of said valve may be obtained.

The form of the invention shown in the drawings is a preferred form, although it is understood that modifications in the construction and arrangement of the parts may be adopted without departing from the spirit of the invention and the scope of the appended claim.

What is claimed is:

A valve for fuel lines comprising a valve member, an operating rod secured thereto, an arcuate rack member adjustably secured to said fuel line and presenting its rack teeth in the direction of said lever, and a knife edge formed on that edge of the operating rod adjacent the rack and adapted to engage the teeth of the rack member to retain the operating rod and valve in adjusted position.

NATHANIEL DU BOIS WHITNEY.